(12) United States Patent
Bril

(10) Patent No.: US 7,392,215 B1
(45) Date of Patent: Jun. 24, 2008

(54) METHOD OF PROCESSING BIDS OVER A NETWORK

(75) Inventor: Moshe Bril, Beit Shemesh (IL)

(73) Assignee: IL Photonics BSD Ltd., Beit-Shemesh (IL)

( * ) Notice: Subject to any disclaimer, the term of this patent is extended or adjusted under 35 U.S.C. 154(b) by 807 days.

(21) Appl. No.: 09/653,266

(22) Filed: Aug. 31, 2000

(51) Int. Cl.
    *G06Q 40/00* (2006.01)
(52) U.S. Cl. .......................... 705/37; 705/27
(58) Field of Classification Search .................. 705/35, 705/36, 37, 27
    See application file for complete search history.

(56) References Cited

U.S. PATENT DOCUMENTS

| | | | | |
|---|---|---|---|---|
| 6,151,589 | A * | 11/2000 | Aggarwal et al. | 705/37 |
| 6,266,652 | B1 * | 7/2001 | Godin et al. | 705/37 |
| 6,269,343 | B1 * | 7/2001 | Pallakoff | 705/26 |
| 6,401,080 | B1 * | 6/2002 | Bigus et al. | 705/37 |
| 6,415,270 | B1 * | 7/2002 | Rackson et al. | 705/37 |
| 2002/0007339 | A1 * | 1/2002 | Hogendoorn | 705/37 |

FOREIGN PATENT DOCUMENTS

| | | | |
|---|---|---|---|
| WO | WO 01/53913 A2 | * | 7/2001 |
| WO | WO 03/027806 A2 | * | 4/2003 |

OTHER PUBLICATIONS

Rockoff, T., Groves, M., Design of an Internet-based System for Remote Dutch Auctions, Internet Research. Bradford: 1995. vol. 5, Iss. 4; p. 10.*

Feldman, R., Reinhart, V., Auction Format Matters: Evidence on Bidding Behavior and Seller Revenue, International Monetary Fund. Staff Papers-International Monetary Fund. Washington : Jun. 1996. vol. 43, Iss. 2; p. 395, 24 pgs.*

Jeitschko, T., Learning in Sequential Auctions, Southern Economic Journal. Stillwater: Jul. 1998. vol. 65, Iss. 1; p. 98, 15 pgs.*

* cited by examiner

*Primary Examiner*—Hani M. Kazimi
*Assistant Examiner*—Stefano Karmis

(57) ABSTRACT

A method of processing bids over a network for an item to be sold, using a time based factor for an encountered level of demand, the method comprising, setting a first threshold level at which to offer the item at a first time, setting a second threshold level at which to offer the item at a second time subsequent to the first time, receiving one or more bids over the network, upon receipt of a bid, calculating a bid time as a function of the first threshold level, the second threshold level, the bid, the first time and the second time, and accepting bids received on the basis of the calculated bid time.

12 Claims, 5 Drawing Sheets

On-line auction

Product for auction

Filename and path of illustration

Please enter a start date

Please enter a finish date

Please enter a quantity for sale

Please enter an initial reserve price

Please enter a final reserve price (note, the initial reserve price should be higher and the difference should indicate your increased concern to sell the product as time passes)

Please enter your personal details

Name

E-mail

Submit

Please click once only

Fig. 4

On-line auction

Auction No. [ ]

Please enter quantity desired
[                                    ]

If only a smaller quantity remains,

◎ Cancel my bid

⦿ Accept the lower quantity

My bid is for $ [ ]

Please enter your personal details

Name [           ]

E-mail [           ]

[ Submit ]
Please click once only

Fig. 5

METHOD OF PROCESSING BIDS OVER A NETWORK

FIELD OF THE INVENTION

The present invention relates to a method of processing bids over a network and more particularly but not exclusively to a method of offering goods or services for sale over a network to remote users at non-fixed prices and incorporating a time value to assessment of the bid.

BACKGROUND OF THE INVENTION

The traditional real life auction in an auction room serves a single audience located together in a single place bidding for one or more items or articles. The auction occurs over a short time frame with a set of bids rising continuously until no-one is prepared to bid any further.

By contrast, auctions over the Internet enable remotely located people to participate together in a single auction. Because the Internet is a worldwide phenomenon it is not easy to get large numbers of interested parties to be on line at the same time. Rather, bids have to be gathered over a predefined time frame and then considered fairly.

Numerous patents deal with the question of managing such Internet auctions between remote bidders. Notably, U.S. Pat. No. 6,044,363, assigned to Hitachi Ltd, discloses an automatic auction method which reduces the need for bidders to remain at auction terminals throughout the duration of an auction and which makes possible auction transactions on an open network on which it is difficult to assure the on-line and real time properties. The method uses a plurality of auction ordering information units each containing a desired price, a maximum price the bidder is prepared to pay, and a number of times desired for purchase. The bids are received from bidder terminals via on-line circuits and a highest bid is determined. In the absence of bids, the price is lowered in stages until a successful bid is identified. If there is at least one successful bid but not all the items have been bid for, then further successful bids are sought by comparing a set price with the remaining available quantity and the highest remaining bid. Until the desired quantity is satisfied, the threshold for accepting bids is adjusted.

In the auction of this method, the bidder is asked to give a bid price and a highest acceptable price. Most bidders do not like to be asked for a highest acceptable price. Furthermore the use of such a highest acceptable price provides a mechanism for pushing up the price relatively rapidly.

The method does not provide a possibility of instant acceptance of a bid should this be required, or of a definite time by which a bidder can know for certain that his bid has been accepted or rejected, beyond the time defined as the end of an auction.

The method considers and accepts bids only at discrete intervals, thereby creating a dead time when no actual sales are possible.

SUMMARY OF THE INVENTION

Embodiments of the present invention may solve at least some of the above-mentioned drawbacks with the prior art.

Embodiments of the present invention take advantage of the time dimension in an auction, hitherto the problem in Internet auction management, to provide a more powerful form of auction.

Embodiments of the present invention allow a time value to be assigned to a product, and for a bid premium paid by a bidder to be seen clearly as a function of time.

Embodiments of the present invention preferably allow the bidder to obtain instant acceptance of his bid, or alternatively, confirmation at a time of his choosing that his bid has either been accepted or rejected.

Furthermore, embodiments of the present invention allow sales to occur at all times during the auction, thus ensuring that there is no commercially expensive dead time.

According to a first aspect of the present invention there is thus provided a method of processing bids over a network for an item to be sold, using a time based factor, the method comprising, setting a first threshold bid level at which to offer the item at a first time, setting a second threshold bid level at which to offer the item at a second time subsequent to said first time, receiving one or more bids over said network, upon receipt of a bid, calculating a bid time as a function of said first threshold bid level, said second threshold bid level, said bid, said first time and said second time, and accepting bids received in the order of said calculated bid time.

In an embodiment, said first threshold bid level is higher than said second threshold bid level and a first bid to be accepted from a plurality of bids to be received is a bid having an earliest calculated bid time.

In a preferred embodiment, said first threshold bid level is higher than said second threshold bid level and comprising the step of accepting any bid from a plurality of received bids, which has an earliest calculated bid time in the past and then accepting received bids as a respective calculated bid time is reached.

In a particularly preferred embodiment, said calculated bid time is a linear function of the passage of time between said first time and said second time.

In another preferred embodiment, said calculated bid time is a linear function of the interval between said first threshold bid level and said second threshold bid level.

In another preferred embodiment, said calculated bid time is a linear function of the passage of time between said first time and said second time, and of the interval between said first threshold bid level and said second threshold bid level, such that any bid within said threshold bid levels is mappable onto a calculated bid time.

In a preferred embodiment, a final bid price is additionally a function of a total quantity of accepted bids. Preferably this involves a step of defining a plurality of quantity price threshold levels, and using said levels to contribute to a determination of said final bid price.

Preferably, there is also provided a further step of using data of existing bids to calculate a probability of acceptance of a new bid at a given price level.

According to a second aspect of the present invention there is provided a method of processing bids over a network for an item to be sold, using a cumulative quantity based factor, the method comprising, setting a first bid level at which to offer the item at an initial quantity, setting at least a second bid level at which to offer the item at a second quantity greater than said first quantity, receiving one or more bids over said network, upon receipt of a bid, calculating a cumulative quantity of items bid for and offering said items at a the bid level corresponding to said cumulative quantity.

In an embodiment, there is provided the further step of using data of existing bids to calculate a probability of acceptance of a new bid at a given price level.

According to a third aspect of the present invention there is provided a tool for providing an on-line indication of the probability of acceptance of a bid at a given price level for a plurality of items offered over a predetermined time period using a predetermined bid acceptance algorithm, said tool comprising a data storage unit, said data storage unit operable to store data of existing bids and corresponding price levels, said tool further comprising a calculator for calculating a probability of acceptance of said bid at a given price level based on said existing bids, said corresponding price levels and said predetermined bid acceptance algorithm.

In an embodiment, said calculator is further operable to calculate a bid level having a 50% chance of being accepted.

BRIEF DESCRIPTION OF THE DRAWINGS

For a better understanding of the invention and to show how the same may be carried into effect, reference will now be made, purely by way of example, to the accompanying drawings, in which:

FIG. 4 is a simplified representation of an on-line form for use by a seller to set up an auction, and FIG. 5 is a simplified representation of an on-line form for use by a bidder to place a bid.

DESCRIPTION OF THE PREFERRED EMBODIMENTS

Figure 1:
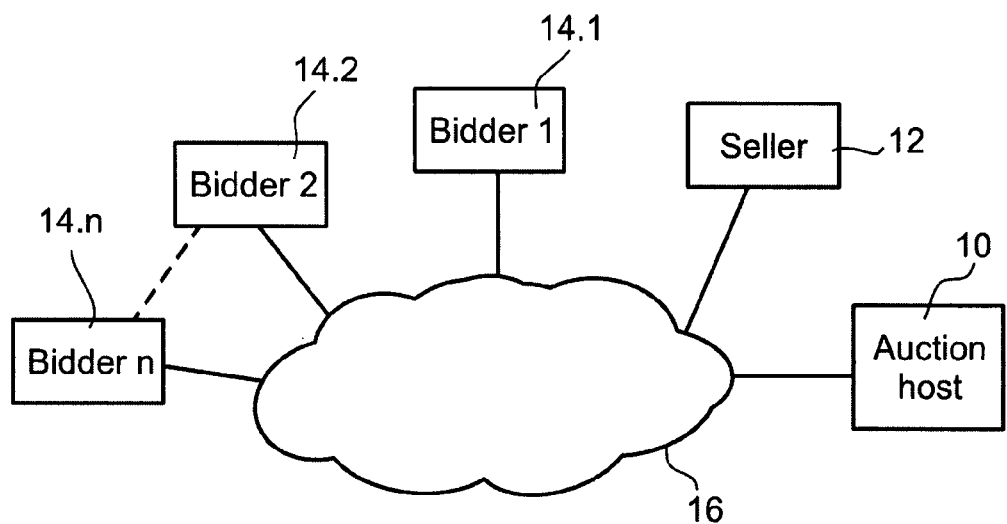
FIG. 1 is a generalized schematic diagram showing an auction host, a seller and a series of bidders connected via a network in a manner useful for holding an on-line auction in accordance with embodiments of the present invention.

Reference is now made to FIG. 1, which is a generalized schematic diagram showing an auction host 10, a seller 12 and a series of bidders 14.1 ... 14.n connected via a network 16 in a manner useful for holding an on-line auction in accordance with embodiments of the present invention. In accordance with embodiments to be described, it is not necessary that the parties are on line simultaneously throughout the duration of the auction. In particular the bidders 14.1 ... 14.n need to be connected only to place their bids. The seller 12 need be connected only to provide settings for the auction, and only the auction host 10 should preferably be on line throughout the duration of the auction. Furthermore the auction host 10 is preferably able to contact bidders 14.1 ... 14.n and seller 10 in the event of a successful bid.

Figure 2:
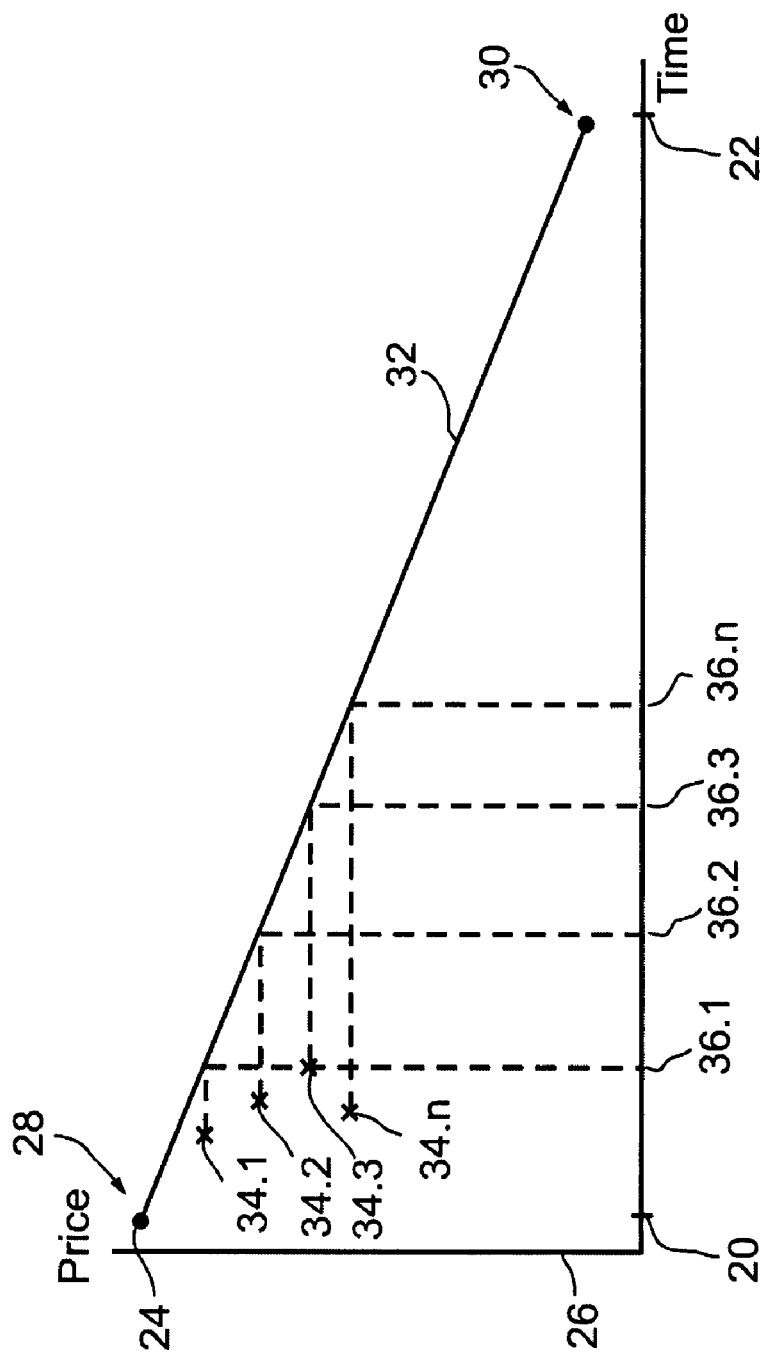
FIG. 2 is a price/time graph showing how a series of bids may be accepted using a calculated bid time, in accordance with a first embodiment of the present invention.

Reference is now made to FIG. 2 which is a price/time graph showing how a series of bids may be accepted in order of respective calculated bid times, in accordance with a first embodiment of the present invention. As will be described in greater detail below, a seller 12 sets start 20 and finish 22 times of the auction. The seller also sets two reserve prices, a starting reserve price 24 and a finishing reserve price 26. The difference between the reserve price represents the willingness of the seller to compromise as time passes in order to find buyers.

An auction staring point 28 is now plotted as the intersection between the start time 20 and the starting reserve price 24. An auction finishing point 30 is then plotted as the intersection between the finishing time 22 and the finishing reserve price 26. A straight line 32 may then be drawn between the auction starting point 28 and the auction finishing point 30 to indicate a dynamically changing reserve price throughout the auction. As an alternative to a straight line, a curve may be used if preferred.

As bids are placed they may be plotted as points 34.1 ... 34.n on the graph. Each bid comprises a price, and a corresponding point where the bid price crosses the line 32 indicates a bid time 36.1 ... 36.n, namely a time at which that bid equals the dynamically changing reserve price. The bid succeeds as soon as the bid time is reached provided the item being auctioned is still for sale. Thus, high bids are rewarded with early acceptance and low bids are kept until later on when the higher bids have been fulfilled. Essentially, the bidder, by bidding at a given price, is setting a time for acceptance of his bid, bearing in mind the risk of the article(s) having been sold before that time. In the graph, bid 34.1 is accepted at time 36.1 and the remaining bids are accepted in order of bid times only if articles remain for sale.

It will be appreciated that a bid could be placed on the line 32 or to the right thereof. The result would be immediate acceptance, unless there are simultaneous higher bids.

Figure 3:
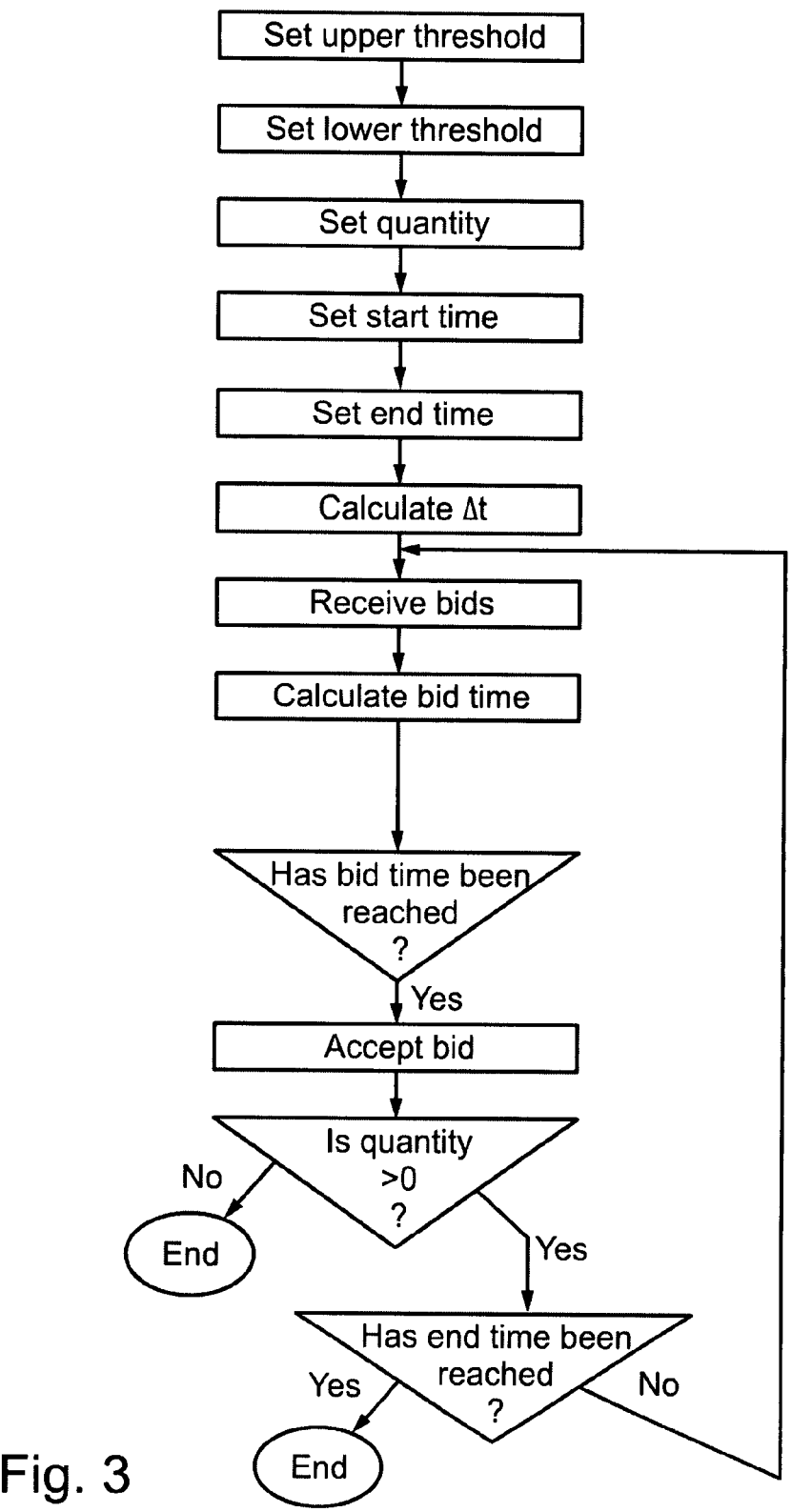
FIG. 3 is a flow chart showing a procedure for holding an auction in accordance with the embodiment of FIG. 2.

Reference is now made of FIG. 3, which is a flow chart showing a procedure for holding an auction in accordance with the embodiment of FIG. 2. In FIG. 3, a seller 12 first sets an upper bid threshold, then a lower bid threshold, then he sets a quantity of items for sale. He then sets an auction start time and an auction end time and calculates a rate of change to give the slope of the graph 32 in FIG. 2.

The auction is then allowed to begin and bids are received. As each bid is received, a corresponding bid time is calculated. Optionally the customer may provide a determined time or accepted time and the network will calculate the Price(Dt) needed as per the above-mentioned equations. Optionally the bidder will than have the option to confirm his bid at that height.

When a bid time is reached, a corresponding bid is accepted until no further items remain for sale. The auction continues until the finishing time 22.

Using the following definitions:

Price (Start time)=Maximum price.

Price (Stop time)=Minimum price.

DeltaP=Maximum price−Minimum Price.

T=Stop time−Start time;

Dt=Determined time, wherein Dt=0 for the start time and Dt=T for the stop time.

At=Accepted time=Start time+Dt

We may define the following relationships:

$$Price(Dt)=Price(0)-(Dt/T)*DeltaP. \Rightarrow \quad \text{(Equation 1)}$$

$$Dt=T*(Price(0)-Price(Dt))/DeltaP. \quad \text{(Equation 2)}$$

The customer bids an amount

X=Price(Dt) at any time <At.

This defines Dt as per equation 2. $\Rightarrow$ $$Dt=T*(Price(0)-X)/DeltaP. \quad \text{(Equation 2.}a\text{)}$$

The bid is accepted at time At if at time At no one has given a higher bid.

In a case of multiple quantities, the bid is accepted if at time=At the quantity requested in the higher bids, if any, is less than the quantity offered.

A procedure is preferably provided to determine what to do in case of two or more equal bids which exceed the available quantity. One possibility is to give priority to the customer whose bid was received earlier.

Alternative relationships that may be used include the following:

$$Price(Dt) = Price(0) - (Dt/T)^2 DeltaP. \Rightarrow \qquad (Equation\ 3)$$

$$Dt = T * Sqrt((Price(0) - Price(Dt))/DeltaP)\ or \qquad (Equation\ 4)$$

$$Price\ (Dt) = Price(0) - (Dt/T)^y DeltaP. \Rightarrow \qquad (Equation\ 5)$$

$$Dt = T * ((Price(0) - Price(Dt))/DeltaP) 1/y \qquad (Equation\ 6)$$

In (equation 5) & (equation 6) the value of y is selectable.

For y=1, line 32 will be a straight line and the case of equations 1 and 2 is provided.

For y=2 equations 3 and equation 4 are achieved and line 32 is a polynomial curve of order 2.

In the general case line 32 is a polynomial curve of order y.

Reference is now made to FIG. 4 which is a simplified representation of an on-line form for use by a seller 12 to set up an auction. The form allows the seller to enter the various setup quantities, start time, finish time, initial price, and final price needed to manage the auction, as well as a brief description and optionally an illustration of the product on offer. The seller may also include details of quantity if he is offering multiple products. Finally the form obtains contact details of the seller 12.

Reference is now made to FIG. 5, which is a simplified representation of an on-line form for use by a bidder 14 to place a bid in an auction run according to the embodiment of FIG. 2. The bidder 14 is asked to identify the auction he is interested in. Preferably this is done automatically because the bidder has obtained the form by clicking on a button labeled "bid" or "place a bid" from a page representing the auction. The bidder is able to specify a desired quantity if relevant and also to indicate whether he is interested in maintaining the bid if the quantity available is less than the quantity he has bid for.

Finally, the bidder 14 is asked to enter personal details.

EXAMPLE

An example of the use of the embodiment of FIG. 2 is as follows:

Mr. Smith wants to rent his apartment from Jan. 1, 2001 till Jan. 1, 2002.

He uses the form of FIG. 4 to place an auction for the rental price for this period according to the details shown in table 1:

TABLE 1

Setup details for apartment rent auction

| | |
|---|---|
| Start moment of the Nauction | Nov. 2, 2000 (0:00 Hours) |
| Stop moment of the Nauction | Dec. 31, 2000 (24:00 Hours) |
| Price (Start date) = Maximum Price | $3600 |
| Price (Stop date) = Minimum Price | $3000 |

According to equation 1& 2.
DeltaP=$600
Dt=($3600−Price(Dt))/$10

A typical bid schedule is as shown in Table 2

TABLE 2

Bids Received and Calculated Bid Time

| Bidder | Date of bid | Height of bid = Price (Dt) | Determined Time (Dt) | Accepted time At = (Nov. 1, 2000 + Dt) |
|---|---|---|---|---|
| Cohen | Nov. 2, 2000 | $3000 | 60 | Dec. 31, 2000 |
| Levy | Nov. 3, 2000 | $3040 | 56 | Dec. 27, 2000 |
| Bush | Nov. 5, 2000 | $3150 | 45 | Dec. 16, 2000 |
| Polak | Nov. 10, 2000 | $3250 | 35 | Dec. 6, 2000 |
| Gore | Dec. 2, 2000 | $3270 | 33 | Dec. 4, 2000 |

In this case Mr. Gore's bid, placed at Dec. 2, 2000, is accepted when the calculated bid time of Dec. 4, 2000 is reached. Mr. Gore and the other bidders were preferably made aware of the calculated bid time corresponding to his bid. I.e. Mr. Levine's knew that in order to get the accepted time Dec. 4, 2000 he had to bid $3270.

As described above, the bidders are aware of previously made bids. An alternative embodiment hides previously made bids.

Should no bids have been accepted by the finish date then the seller may reset the options and start again or not as he prefers.

Advantages of the invention include the following:

As long as there is one bid which exceeds the final reserve price there will be a successful outcome to the auction, A higher bid obtains earlier acceptance, The bidder effectively decides the timing of the acceptance of his bid, The seller will get a reasonable price as long as there is demand, Excess demand is translated into a time premium, thus making the bidding fair to all sides, Buyers and seller are not required to be on line for the duration of the auction, thus making the method suitable for auctions of large quantities of goods over a long period of time.

Typical applications may include

Real estate (Rentals, second hand)

Occasions (vehicles, plains, boats, etc)

Fine art

Advertisement space, and

Large scale auctions of commodities and the like.

According to a further embodiment of the present invention there is provided a platform for bidding for products or services over a network. The embodiment leaves suppliers to determine the prices of the articles at certain predefined quantity breaks, while it accumulates quantities purchase by individual customers for the benefit of all the other customers. It thus enables customers to benefit from an accumulated quantity discount, enables both sides of benefit from a bidding process and enables both sides to benefit from personal quantity discounts.

A supplier, wishing to sell his products or services, enters the platform independently, and fills in a form defining prices with quantity breaks and giving product descriptions and other necessary information according to the standard terms of the platform. His offer thus goes on-line without requiring manual intervention on the part of the platform provider.

As above, the platform provider may take a one-time fee or may be paid on a commission basis, or advertisement basis or any other form of income or for free, as is deemed appropriate by the platform provider.

The embodiment allows small and large quantity customers to bid on a single platform.

The present embodiment may be combined with the bid forecast facility described below to provide a potential customer with a probability assessment of acceptance of a bid at a given price level prior to his making the bid, i.e. one figure that directly represent the information that he will need prior to his decision.

An optical field on a form presented to the customer to make the bid allows the customer to enter a date and/or time for the bid to cease to be valid.

Algorithm

The embodiment works as follows:

The supplier specifies to the platform the price of an article as a function of the quantity purchased, a close date when the bids to the offer will be resumed, and other product information, e.g.

| Group | Minimum qty for this price MinQ(group) | Max. Quantity for this price MaxQ(Group) | Price(Group) |
| --- | --- | --- | --- |
| 1 | 1 | 9 | $1000 |
| 2 | 10 | 23 | $ 925 |
| 3 | 25 | N | $ 900 |
|  |  | HG = 3 |  |

Close data Dec. 31, 2000

Optionally, in addition to quantity differential pricing the supplier can offer a personal discount, say $50 for any individual ordering 5 pcs or more of this article.

2 =>

The platform offers the article at all the group prices simultaneously, e.g.

| Unit Price | Probability | 5 Unit quantity discount | Probability with quantity discount |
| --- | --- | --- | --- |
| $1000 | 100% | $950 ($50 PER ITEM?) | 100% |
| $ 925 | 80% | $875 ($50 PER ITEM?) | 95% |
| $ 900 | 50% | $850 ($50 PER ITEM?) | 60% |

3 =>

Each customer may bid for the article at any of those prices, i.e. in this example $1000, $925 or $900 for a single unit customer and $950, $875 and $850 for a 5 unit customer. Of course, the probability that the lower prices will be reached is the probability that the relevant quantity break will be triggered by the customers as a whole. Thus the lower a customer bids the smaller the probability that his bid will be accepted.

4 =>

At the specified close of bidding all bids are summarized, e.g.

| Group | Bid (Group) (QUANTITY?) |
| --- | --- |
| 1 ($1000) | 5 |
| 2 ($925) | 10 |
| 3 ($900) | 5 |

In the table, price level 1 is triggered because there is at least one bid. Price level 2 is also triggered because there are more than 10 bids. Price level 3 is not triggered because there are not the 25 bids required. Thus the entire lot is sold at price level 2, namely at $925, to all of the customers who bid $925 or more, (15 sales).

One could resume the actual applied price and winning bids with the following program routine:

BQ is the accumulated quantity of pieces bid for during the offer. (20 in this case)
RBQ (remaining bid quantity)=BQ.
RHG (remaining highest group)=HG.
QB (quantity bought)=0.
POD (Price of deal)=Price(1).
While (RBQ>0) do
{
  If (RBQ>=MinQ (RHG))
    {QB=RBQ;
    POD=Price(RHG)}
Else
  {RBQ=RBQ-BID(HG);
  HG=HG-1;}
}

This routine can be written in most programming languages.

As mentioned above, in this example 15 units will be brought at a price level of $925. The remaining units are not successfully bid for since not enough units were successfully bid for to trigger the relevant discount. Thus the supplier sells 15 units at the multiple discount price for that number of units, and the purchasers benefit from the purchases made by other bidders.

When the bid price is combined with the five units personal quantity discount of $50 mentioned above, the successful bidder obtains his units at $875 each.

In the above embodiment, the personal quantity discount allows recognition of different types of customers such as trade customers, so that retail and wholesale customers can be serviced from a single platform.

Generally, if the customers receive an overall discount provided they reach a certain quantity between them as described in the previous embodiment, the large quantity customers have no special incentive to purchase and the previous embodiment without a special quantity discount is most useful in circumstances in which the quantity purchased is similar for most customers. The quantity discount is particularly useful when there are marked differences in quantities purchases between different customers or different types of customers.

The same form of personal quantity discount can be applied to a bidding process as in the previous embodiment.

Algorithm:

Customers with large quantity orders may receive a personal quantity discount. This personal discount should come in addition to the group quantity discount applied discussed above.

For example

A single customer that purchases 10 pieces will receive a personal discount of $50, 100 pieces $75 and 1 k pieces $100. I.e.

| Quantity | Discount |
| --- | --- |
| 10 | $ 50 |
| 100 | $ 75 |
| 1000 | $100 |

This will reduce the actual price as follows:
The qty Isaac orders Standard price for qty 1 orders Discounted price for Isaac

| | | |
|---|---|---|
| 1 | $1000 | $1000 |
| | $ 500 | $ 500 |
| | $ 200 | $ 200 |
| 10 | $1000 | $ 950 |
| | $ 500 | $ 450 |
| | $ 250 | $ 200 |
| 100 | $ 500 | $ 425 |
| | $ 250 | $ 175 |
| 1000 | $ 500 | $ 400 |
| | $ 250 | $ 150 |

One could provide personal discounts to specified groups, for example: authorized dealers (with service after and presales, active marketing, sample showing etc.) master dealer (selected authorized dealers), etc.

To protect commercial information one could protect these personal discounts with a password.

The Quantity discount feature allows one to address different categories of customers in a single offer. A retail customer may buy a Radio at $100 from X while a retail store buys 1000 radio's using the same offer from X but pays $75.

Currently, combined bidding for wholesale and retail markets is not known. Suppliers do not like to put their products in a regular auction because this will give the end-user the same pricing as the shop that needs to display the radio, has to deliver it and may be required to provide pre and after sales service etc. In the long run the shops won't sell X radios so the consumers cease to see them in the shops and won't even bid for them at the auction.

According to a further embodiment of the present invention there is provided a method for providing a potential bidder with a percentage probability of acceptance of his bid. In general, auctions are liked because the final price is linked to actual demand at the auction and a potential purchaser has the possibility of paying less than he would do otherwise. On the other hand he pays for this by the possibility that a low bid may not be accepted. It is very hard for the customer to decide on the height of the bid. He wants a reasonable chance to get the product at a reasonable price. However he has no information on demand. The present embodiment provides the purchaser with a statistical tool giving him a qualifiable figure as to the likelihood that a bid at a given price and for a given quantity will be accepted.

The statical tool may be combined with any of the embodiments given above. In the following it is shown in combination with the cumulative discount embodiment.

For the cumulative discount embodiment the supplier gives the following information:

| Price per unit | Qty |
|---|---|
| $1000 | Min (Typically 1) |
| 1 week | |
| $ 900 | A > Min |
| first 50% 1 week | |
| other 50% 2 weeks | |
| $ 700 | B > A |
| $ 600 | C > B |
| $ 500 | D > C |
| 10% week | |
| 30% mnth | |
| 30% 2mnth | |
| 30% 3mnth | |

-continued

| Price per unit | Qty |
|---|---|
| $400 | Maximum absolute (no more available)/ relative(may be higher, but no price change) |

The following information is also needed, some of which is given by the supplier and some of which is preferably available from the platform:

The quantity the supplier sells today (in units/year).

The global market at present (in units/year). This number should include the quantity the competitors sell.

The estimated global market if the price will be as in the Maximum quantity ($400 in the example).

The estimated global market over 1 year at the current price level.

The estimated global market over 1 year at the Maximum quantity price level.

The following formula produces a percentage figure for a bid at a given quantity break price being successful.

In words, if a quantity break has already been reached then a figure of 100% is given. If it has not been reached then the rate of received bids is extrapolated over the time remaining for the auction to forecast whether the quantity break specified by the bid will be reached.

Qty ordered assumes the person entering the site as if he bid at the product, as this is the hypothetical case of his interest.

The probability may be calculated in a number of ways. One possibility is as follows:

The potential buyer will have to tell first how many pieces he wants to buy.

Cqty=Qty the potential purchaser consider to purchase;

Oqty=the quantity that has been purchased sofar;

Periodpast=Amount of time (hours) the offer has been open till now.

(6 minutes=0.1 hour etc.)

Periodtotal=Amount of time of spender has been defined.

Periodfuture=Periodtotal−Periodpast;

```
If((Oqty +Cqty) >= MinQ(Group)
Chance2deal(Group) = 100%;
Else
{
Pastspeed =      (Oqty +Cqty/2) / Periodpast;
Needspeed =      (MinQ(Group)−(Oqty+Cqty/2)) / Periodfuture.
Speedratio =     Needspeed/Pastspeed;
If(Speedratio> 1)
    Chance2deal(Group) = 50%/Speedratio;
    Else
    Chance2deal(Group) = 100%−Speedratio*50%;
}
```

This Chance2deal(Group) can be calculated for all groups.

The customer will see on the site the article of his interest displayed something like this:

| Unit Price | Chance2deal |
|---|---|
| $1000 | 100% |
| $ 925 | 80% |
| $ 900 | 50% |

A third order factor can also be added to provide a look-ahead and improve the model.

Thus a probability of a successful deal can be calculated for each quantity break price.

By adding further orders to the equation, more sophisticated probabilities can be produced.

The potential bidder may be given results as possible for a range of bids.

| Price | Chance2deal |
|---|---|
| $1000 | Not relevant anymore |
| $ 900 | 100% |
| $ 700 | 80% |
| $ 600 | 50% |
| $ 500 | 20% |
| $ 400 | 2% |

Here Chance2deal(price=X)=The probability that a bid X will lead to a deal.

EXAMPLE

An example of the probability being calculated for the cumulative volume discount embodiment is as follows:

Given the following ordering history, for a product that was offered over the period 1-10 Apr.

Assume $925 price for 10 pieces or more.
Assume $900 price for 25 pieces or more.

| Date in April | 1 | 2 | 3 | 4 | 5 | 6 | 7 | 8 | 9 | 10 |
|---|---|---|---|---|---|---|---|---|---|---|
| Qty ordered | 1 | 0 | 2 | 1 | 1 | 2 | 1 | 1 | 1 | 1 |
| Chance2deal $925 at 23:59 | 50% | 22% | 50% | 50% | 50% | 68% | 71% | 78% | 100% | 100% |
| Chance2deal $900 | 19% | 8% | 16% | 14% | 13% | 13% | 10% | 7% | 4% | 0% |

Pastspeed = (Oqty)/Periodpast;

Needspeed = (MinQ(Group)-(Oqty))/Periodfuture).

The function meets the following conditions, which are elementary conditions of a probability function:

If the Orderspeed is very close to the needspeed (Orderspeed=Needspeed) the chance the qty needed or will not be reached in close (Chance2deal=50%) (Chance2deal (Orderspeed/Needspeed=1)=50%).

If the Needspeed=0 the Chance2deal=100%

If the Orderspeed is higher then the needseped 100%>Chance2deal>50%

If the Orderspeed is lower than the needspeed 50%>Chance2deal>0%

The larger Orderspeed/Needspeed the larger the Chance2deal

The closer one gets to the stop date the more explicit the Orderspeed/needspeed will be and the clearer the Chance2deal will give a direction.

The Chance2deal function is a simple mathematical formula that meets all the above conditions.

It behaves as a mathematical 1st order function and in all points the derivatives from both sides are equal.

In the first order it is therefore correct (I.e. it is a correct first order approximation of the probability function and meets all above mentioned conditions)

One could derive higher order function, as will be discussed below. The higher order functions are more complex but still obey the same conditions.

In order to use the embodiment with the time factor auction embodiment it is necessary to define the Spast variable as the orders at the later date and a new variable chance2miss wherein chance2deal=1−chance2miss.

[For tender one can use a similar model as Nauction.

For auction use the Percentual$increase/day as parameter and use the $2^{nd}$ model i.e.

Day 1 $100 2 $200 3 $400=>100%/day if on day 5 bid closes $1600=50% $450=2% $2800=75%.

The probability can be estimated each time a bid is made, or it can be estimated at regular intervals for the different quantity breaks.

In an embodiment the user screen may show a message of the form probability of bid acceptance at $100=70%. The screen then invites the user to update the estimate if the qty of purchase is22 1.

In a further embodiment of the present invention a method is shown for indicating on-line a predicted closing price.

As mentioned above, bidding instead of buying at a fixed price gives a price incentive to the customer in return for an uncertainty factor he is willing to accept.

The embodiment uses an algorithm which is derived from the above-mentioned probability algorithm.

Assume the e-value to be the bid level at which a calculated probability according to the above probability algorithm is 50%.

That is to say Chance2deal(x)=50%.

Using the above-defined nomenclature is when

Pastspeed=Needspeed=Futurespeed.

In the previously mentioned example, substitution gives the following:

| Date in April | 1 | 2 | 3 | 4 | 5 | 6 | 7 | 8 | 9 | 10 |
|---|---|---|---|---|---|---|---|---|---|---|
| Qty ordered | 1 | 0 | 2 | 1 | 1 | 2 | 1 | 1 | 1 | 1 |
| Chance2deal $925 at 23:59 | 50% | 22% | 50% | 50% | 50% | 68% | 71% | 78% | 100% | 100% |
| Chance2deal $900 | 19% | 8% | 16% | 14% | 13% | 13% | 10% | 7% | 4% | 0% |
| E-value in $ | 925 | 1000 | 925 | 925 | 925 | 925 | 925 | 925 | 925 | 925 |

In combination with the time value auction embodiment, an e-value may be calculated as follows:
Firstly we define the following variables:
CloseM=The moment when the Auction close;
OpenM=The moment when the auction starts;
OpenValue=The start value of the auction;
PastT=Is the amount of time past since OpenM;
Period=CloseM-OpenM;
FutureT=Period-PastT;
Bid(PastT)=The highest bid till the moment PastT;
DeltaV(PastT)=Bid(PastT)-OpenValue;
Valuespeed(PastT)=DeltaV(PastT)/PastT;
Then we may calculate:
e-value(PastT)=Bid(PastT)+FutureT*Valuespeed(PastT);
The results for our above example are as follows:

| Date in April | 1 | 2 | 3 | 4 | 5 | 6 | 7 | 8 | 9 | 10 |
|---|---|---|---|---|---|---|---|---|---|---|
| Bid(PastT) | 0 | 130 | 130 | 160 | 160 | 190 | 240 | 244 | 280 | 300 |
| Valuespeed (PastT) at 23:59 | 0 | 15 | 10 | 15 | 12 | 15 | 20 | 18 | 20 | 300 |
| Openvalue in $ | 100 | | | | | | | | | |
| E-value in $ | 100 | 250 | 200 | 250 | 220 | 250 | 300 | 280 | 300 | 300 |

There are thus provided a series of features for incorporating into a bidding platform which features are adapted for the online nature of the bidding process, in particular they take advantage of the special features of online bidding, namely that the bidding is spread out over a period of time and and that bidders are remote from other bidders to provide a better representation of global supply and demand for the product or service.

In a further embodiment of the present invention a method is shown for on-line price adjustment using a negative feedback mechanism that effectively, accurately and fast reaches the equilibrium price where supply equals the demand.

In the basic form of this method the customer that inquires to purchase a product will be quoted the e-price that is valid during the timestep of his inquiry. If he decide to purchase this will be at that price (e-price).

This method is universal and can be applied in 90% of all products and services offered. It needs no modification in most of the markets.

The method has a basic form that addresses markets with a limited stock that is offered over a limited period of time, like tickets for a cinema.

In a further embodiment of this method, products that are in continuous production can be offered during an unlimited amount of item, i.e. It will continue till the supplier quits the offer.

In a further embodiment of this method the timestep will be released to the potential customers, i.e. the potential customer will know till when the e-price he sees will be valid, and optionally what will be the maximum change of the price compared to the next timestep.

The method effectively measures the supply and demand curve online, without interfering to strongly with the market itself, and uses this measurement to approach automatically and effectively the equilibrium e-price where supply equals demand.

In a further embodiment of this invention the customer that inquires at timestep=x and finds the e-price to high, can put a purchase request to buy the product at the price he will specify in the next timestep where the e-price will reach this price. Optionally he can condition this request by time, e.g. he conditions to purchase the product at $120 on the condition the timestep that will reach this price will be not later than x+3 (e.g. within 3 days from now).

Algorithm resume:

The period of the offer will be divided in timesteps or offer steps.

Timesteps are basically units of periods over which the e-price remains constant,
i.e. during one time step (e.g. one day or one hour) or offer step (e.g. after each 10 pieces sold) the e-price of the article offered will remain constant.

Both the accumulated Supply/Demand ratio and its time derivative in the last time step are measured. Optionally one could also measure higher derivatives of time. A negative feedback mechanism is used to correct the price for the next time step.

Both measurements determine the limited modification in price for the next timestep.

During the new timestep again these 2 measurements will be done and can increase cancel or leave the price change of the former timestep.

Background:

Today the suppliers only guess the price of an article.

This tool enables the market to reach fast the supply/demand equilibrium i.e. The price where Supply equals Demand. The more statistical input (in the form of orders) and the smaller the time step the faster and more accurate this can happen. The market that operates around the equilibrium where supply equals demand reduces unsold stocks and overproduction from one side and shortage and inflation from the other side.

General Statement of the Embodiment

"A Tool that allow suppliers to offer multiple quantity of products at a price that updates automatically online, approaching the equilibrium value (e-price) of the product to be offered, based on the supply input of the supplier and demand input of the customers, within a price framework defined by the supplier,including optional number of timesteps, maximal adjustment by time, a maximum and minimum price frame, while optionally the tool is not limited to address limited stock articles but also products under production"

The algorithm:

1—The period of the offer or time constant of the offer has to be defined.

E.g. for an offer that runs 100 days

TOO=Time_of_offer=100days

2—The number of time steps, defining the number of periods within the TOO where the e-price remains unchanged, has to be defined.

E.g. if there will be 100 of such units during the offer

Timesteps=100

DOT=Duration of timestep=TOO/#Timestep, in this example 100days/100=1 day.

3—The start price at which the offer will be quoted during the first timestep will be defined e.g. $150.

Startprice=$150

Optionally the highest end lowest price can be limited e.g. by $100 and $200 respectively.

Topprice=$200 (Optional)

Minprice=$100 (Optional)

4—The maximum price adjustment, i.e. the relative difference in e-price between timestep X and X+1

MAPT=Max((e-price(X)-e-price(X-1))/e-price(X))

MAPT=Max_adjustment_per_timestep is set to 10% in this example.

MAPT=0.1

Optionally this can also be an absolute different e.g. $10.

The maximum MAPT due to the accumulated demand and supply ratio is defined e.g. 5% for accumulated demand/supply

APTDS=0.05

The maximum MAPT due to the time derivative of the demand and supply ratio is defined e.g. 5%

APTDT=0.05

With APTDS+APTDT=MAPT

The tolerance of the accumulated supply/demand, i.e. the ratio of Supply/demand that differs from unity that will lead to a price changed from timestep to timestep, will be defined. E.g.

AcTol=Accumulatedtollerance=0.10

The tolerance of the derivative of supply/demand, i.e. the ratio of derivative of Supply/demand that differs from unity that will lead to a price change from timestep to timestep, will be defined. E.g.

DerTol=Derrivativetollerance=0

Needquanity=number of pieces that are offered but haven't been sold yet.

Past=Period of time of the offer that has past already.

Future=TOO-Past

Needspeed=Needquanity/Future.

Soldquantity=Amount of pieces sold till now

Pastspeed=Soldquantity/Past

Lastspeed=The quantity sold during the last timestep/DOT

```
I=0;                    /** Start at timestep number 0 **/
EPrice(I) = Start price;   /** The eprice at timestamp number 0
is set to the start price **/
  Wile(I<#Timesteps)
  {
I++;                    /***index is incremented**/
Tprice=Eprice(I-1)      /*** Tprice is temporary price is set to the
price of the last timestep ***/
  If (Neeedspeed> ((1+AcTol)*Pastspeed))
    Eprice(I) = Tprice*(1-APTDS);
  Elsif (Needspeed< ((1-AcTol)*Pastspeed))
    Eprice(I) = Tprice*(1+APTDS);
  /***In the example:
```

If during the accumulated time the demand was less than 10% than the supply the price will be lowered by 5%, if during the accumulated time the demand was more than 10% than the supply the price will be increased by 5%, **/

If(Needspeed>((1-DerTol)*Lastspeed))

Eprice(I)=Tprice*(1-APTDT);

Else (Needspeed<((1+DerTol)*Lastspeed))

Eprice(I)=Tprice*(1+APTDT);

/***In the example:

If during the last timestep the orderspeed was less than needed to finish the complete stock on the end date of the offer, then the price will be lowered by 5%, If during the last timestep the orderspeed was more than needed to finish the complete stock on the end date of the offer, the price will be increased by 5%, **/

If (Eprice(I)<Lowest price)

Eprice(I)=Lowestprice;

If (Eprice(I)>Highestprice)

Eprice(I)=Highestprice;

}

The product and or services will be offered at timestep=I at Eprice(I);

Optionally the tool may suggest and/or define the above mentioned constants based on the input parameters of the supplier and/or the statistical data of the bought products during the offer. These constants include number and length of time step, Max adjustment etc. This may even be modified online based on the statistical input of orders.

In case of an ongoing offer one can choose time step and time of the offer for calculation purposes only, using an algorithm like timesteps=100; i.e. the offer will not finish at timestep=100 but the offer will be handled as if the amount that will be available at timestep # 100 should be sold on that time. This point of time will however shift in time. E.g. on Mar. 20 the algorithm calculates the price as if the pieces available till May 5 need to be sold till May 5. However on Mar. 21 the algorithm calculates the price as if the pieces available till May 6 need to be sold till May 6, This will require only a small addition to the above mentioned algorithm like If(I<#timesteps/2)

CorectedI=I;

Else

Corrected I=#timesteps/2;

The rest of the above algorithm should run with the correctedI.

I.e. it calculates all statistical data as if the offer started #timesteps/2 ago and will last another #timestep/2.

As long as the offer doesn't reach the #timestep/2 the offer runs as if it will finish at #timestep.

Just as an example the period of the offer could be set to 2*delivery time of the product, while the number of pieces to be sold will be the number of pieces finished over that period, I,e, the number of booked products should equal the number of produced products. If in the last 50 timesteps this wasn't reached, the price should lower if it was reached at the last time step it should higher etc.

Further one could optionally use the online delivery information on all "quotations". This simply by combining the general lead time with the orders received till now.

Example Illustrations 1

The method of limited stock

Case: The supplier wants to sell 100 cinema seats in 10 days (10 time steps). All other parameters as the above mentioned values.

Note that

From the 6th day onward the accumulated supply is reduced by the quantity purchased during that timestep, while 10TV sets are added that represent the production quantity during that day.

The accumulated demand accumulates only over the last 5 timesteps (From the 5th step onwards)

On the 11th day the offer will continue and the price will be $120.

The Supply and demand have been normalized to a period of 10 days, i.e. The supply and demand that has been accumulated over 5 days will be multiplied by 2 before it will be displayed in the Demand and Supply section. In this normalization the number of the supply and demand of one day will be multiplied by 10. This normalization doesn't effect the ratio but may help to understand the numbers displayed above more easily.

| Date/# Time st | 1 | 2 | 3 | 4 | 5 | 6 | 7 | 8 | 9 | 10 |
|---|---|---|---|---|---|---|---|---|---|---|
| Eprice (Date) | $150 | $135 | $121 | $109 | $109 | $114 | $120 | $114 | $120 | $126 |
| Sold in date | 5 | 7 | 9 | 13 | 14 | 11 | 10 | 12 | 10 | 8 |
| Sold quantity | 5 | 12 | 21 | 34 | 48 | 59 | 69 | 81 | 91 | 99 |
| Accumulated Demand/Supply | 0.5 | 0.56 | 0.64 | 0.77 | 0.92 | 0.96 | 0.95 | 1.07 | 1.12 | |
| Derived Demand/Supply | 0.5 | 0.66 | 0.82 | 1.18 | 1.35 | 1.07 | 0.97 | 1.41 | 1.11 | |
| Need speed | 10.56 | 11 | 11.29 | 11 | 10.4 | 10.25 | 10.33 | 9.5 | 9 | |

In the example the e-price helped to sell 99 out of 100 seats at a price that represent the value on the day of purchase. During the first days the e-price noticed that the supplier fixed a start price that is too high, and adjusted the price accordingly in course of time.

Example Illustrations 2

The method of ongoing production

Case: The supplier wants to sell 100 TV set in TOO=10 days (10 time steps). All other parameters as the above mentioned value, in the following days there will be an additional 10 sets per day available for sale. I.e. it will be not to important for the supplier to finish these 100 TV sets in the 10th day but he wold like to have an average selling speed of 10 TV sets per day.

In case on the 10th day more than 11 pcs would have be ordered, they could have been delivered only during the next day, because they wouldn't have been in the stock.

Optionally the supplier could change the Supply and/or production in put in cause of time, e.g. if he will hire a new worker and form date 9 the number of TV sets will increase to 15/day the offer will change accordingly.

As an opoin to both methods one could change several parameters in course of time as a function of time or statistical input. For example:

As a function of IT=is the index of timestep (1 for the first time step 2 for the second etc)

MAPT=0.1/Sqrt(IT)
APTDS=0.05/Sqrt(IT)
APTDT=0.05/Sqrt(IT)
AcTol=Accumulatedtollerance=$0.10/(IT)^{0.33}$

| Date/st | 1 | 2 | 3 | 4 | 5 | 6 | 7 | 8 | 9 | 10 |
|---|---|---|---|---|---|---|---|---|---|---|
| Eprice (Date) | $150 | $135 | $121 | $109 | $109 | $114 | $120 | $120 | $120 | $114 |
| Sold in date | 5 | 7 | 9 | 13 | 14 | 11 | 10 | 10 | 10 | 11 |
| Sold quantity | 5 | 12 | 21 | 34 | 48 | 54 | 57 | 58 | 55 | 52 |
| Accumulated Demand/Supply | 0.5 | 0.56 | 0.64 | 0.77 | 0.92 | 108/101 1.07 | 114/101 1.12 | 116/101 1.15 | 110/101 1.09 | 104/100 1.04 |
| Derived Demand/Supply | 0.5 | 0 66 | 0.82 | 1.18 | 1.35 | 110/101 1.09 | 100/101 0.99 | 100/101 0.99 | 100/101 0.99 | 110/100 1.1 |
| Need speed | 10.56 | 11 | 11.29 | 11 | 10.4 | 10.1 | 10.1 | 10.1 | 10.1 | 10 |

DerTol=Derrivativetollerance=0

This will allow to correct fast for the e-price in the beginning where the start-price will be far from equilibrium and more fine in cause of time where the price gets closer to equilibrium.

Example Illustrations 3

A limited stock item with above mentioned IT dependence except for Actol that has been set constant to 0.1 for simplicity.

| Date/# Time at | 1 | 2 | 3 | 4 | 5 | 6 | 7 | 8 | 9 | 10 |
|---|---|---|---|---|---|---|---|---|---|---|
| Eprice (Date) | $150 | $135 | $125 | $118 | $112 | $112 | $112 | $114 | $116 | $120 |
| Sold in (Date) | 5 | 7 | 8 | 10 | 13 | 13 | 13 | 12 | 11 | 11 |
| Sold quantity | 5 | 12 | 20 | 30 | 43 | 56 | 69 | 81 | 92 | 102? |
| Accumulated Demand/Supply | 0.5 | 0.56 | 0.58 | 0.64 | 0.75 | 0.82 | 0.95 | 1.07 | 1.27 | |
| Derived Demand/Supply | 0.5 | 0.66 | 0.7 | 0.85 | 1.14 | 1.07 | 1.26 | 1.41 | 1.37 | |
| Need speed | 10.56 | 11 | 11.4 | 11.7 | 11.4 | 11.33 | 10.33 | 9.5 | 8 | |

In this example the stock was finished before the end of the offer as during the last day one could have sold 11 pcs while there were only left 9 pieces. Although one sees not a clear improvement compared to the regular version this is because the start price was far from the equilibrium. To compensate for this one should choose with this option a higher MAPT to start with, like 0.15. In this case, then it will provide a smoother evaluation.

Or as another example as a function of the Statistical input e.g.

DeltaPriceSpeed(IT)=DPS(IT)=Absolute value of (Start-price-e-Price(IT))/IT.
For IT>1
MinApt=0.01
MAPT=MinApt+DPS(IT)*2
APTDS=MinApt+(DPS(IT))
APTDT=MinApt+DPS(IT)
AcTol=Accumulatedtollerance=$0.10/(IT)^{0.33}$
DerTol=Derrivativetollerance=0

Example 4

A limited stock item with above mentioned statistical input function dependence (but Actol=0.1=constant, and MinApt=0 for simplicity).

In a further embodiment of the present invention a method is shown for bidding on a network for similar but not identical transport request.

General Statement of the embodiment:

This is a method that uses a fully computerized procedure to create a transportation service tailored and optimized to the actual demand of all serious customers, using today's available computation and communication power, a novel algorithm of matching similar but not equal transportation requests to enable consolidation of services, and reducing their costs.

This transport service can include the delivery and or transport of persons and or goods. For the matter of simplicity, in the rest of the description of the model the product will be named "route", and the operator of the procedure "Way2gether".

The communication can be done by phone, WAP, e-mail or Internet. I will relate to the mode of communication in the description as Internet which may be the most realistic mode to implement this idea.

The computation power for a limited area of interest could be done with a commercial PC (Pentium III or so), but I will refer to it as the SERVER.

Algorithm Resume Way2gether

1 => The customer should start his request for a route by providing some route details.

The number of route details requested and provided may vary, but could for instance include the below bold printed requested and italic printed provided.

| | Leaving | Arriving |
|---|---|---|
| ZIP | 95348 | 953867 |
| Time | 8:00 +/− 10 minutes | 9:00 +/− 10 minutes |
| Return time | 17:00 | 18:00 |

| Date/# Time st | 1 | 2 | 3 | 4 | 5 | 6 | 7 | 8 | 9 | 10 |
|---|---|---|---|---|---|---|---|---|---|---|
| Eprice (Date) | $150 | $135 | $105 | $105 | $135 | $131 | $127 | $119 | $111 | $116 |
| Sold in date | 5 | 7 | 16 | 16 | 7 | 8 | 8 | 10 | 13 | 11 |
| Sold quantity | 5 | 12 | 28 | 44 | 51 | 59 | 67 | 77 | 90 | 101? |
| Accumulated Demand/Supply | 0.5 | 0.56 | 0.86 | 1.18 | 1.04 | 0.96 | 0.87 | 0.84 | 1 | |
| Derived Demand/Supply | 0.5 | 0.66 | 1.57 | 1.71 | 0.71 | 0.78 | 0.73 | 0.87 | 1.3 | |
| Need speed | 10.56 | 11 | 10.2 | 9.33 | 9.8 | 10.25 | 11 | 11.5 | 10 | |
| DPS (IT) | | $15 | $22.5 | $15 | $4 | $4 | $4 | $4 | $5 | |

-continued

| Full address | Amsterdam Ave 166 Passaic NJ | Broadway 157 NY NY |
|---|---|---|
| Maximal allowed walking | 5 minutes | 5 minutes |

| Maximal budget | $150/Month |
|---|---|
| Weekdays to work | Mo/Tu/We/Th/Fr |
| Last day of the month to accept an offer | 4 days before the end of each month |
| Credit card number | 123456789123 |
| Interest in trip till | Further notice |

After the details have been submitted.

2 =>

The company (way2gether in this case) should provide a list of possible connections that meet these requests or is close to this request.

For example

| Extra pay for home 2 home transport | Leaves | Arrive | Price Chance2deal |
|---|---|---|---|
| $25 | 7:30 From Amsterdam Ave 120 Passaic NJ | 8:15 Broadway 120 NY | $100/100% $80/80% $65/50% $55/25% $50/10% |
| $35 | 8:00 From Amsterdam Ave 75 Passaic | 8:55 Amsterdam Ave 150 NY | $175/100% $130/80% $105/50% $80/28% |
| $25 | 8:30 From Amsterdam Ave 120 Passaic NJ | 9:20 Broadway 120 NY | $90/100% $75/85% $65/70% $55/60% $47/35% $40/15% |

This listing may include

A selection of routes that have been offered once before by the company (way2deal) and/or newly defined routes based on the requests put by the customer and a master price list and/or pricing program.

Optionally these routes can be offered with an innovative deal-mode that was mentioned elsewhere in this invention. For simplicity I will use the method where the customers accumulates to a common quantity break.

3

The customer should select at least one option e.g.

| $35 | 8:00 From Amsterdam Ave 75 Passaic | 8:55 Amsterdam Ave 150 NY | $130/80% |
|---|---|---|---|

=>4

The customer will receive a confirmation in some form when the deal is accepted.

This innovation could be exploited in various ways including:

Way2gether could exploit the transport service completely, and/or

Close master agreements with transport companies, and bill the customer including a mark up, and/or Receive a commission from the third parties transport companies that sell and or produce the service, and/or Advertisements of third parties on a web-site that offerers the service.

Other ways

Potential Markets way2gether

First Market: Home to work.

Addressing both luxury car drivers and upgrading public transport.

Second market: Coincidental travel.

Including Cinema, Theater, sport events and regular.

Third market: Vacation travel.

Including busses Amsterdam—Costa Brava, chartering flights, trains boats. Etc

Fourth market: Parcels, goods and letter transport.

Way2gether.com

The interactive travel office

Algorithm

Introduction:

This section explains to a programmer how to write the way2gether source code.

The actual writing of the code should commence when relevant budget is available. This is expected to take 3 months for 4 full time programmers. No imagination is needed of these programmers and at the function described herein are straightforward for an expert in the art of programming.

Main

The main function intended here describes one run on the central computer for the entire project.

It will create a framework that can accept third parties information.

One can start a main program for each country or area separately.

Addresses like way2gether.com with links to way2gether.uk, way2gether.nl etc. seem obvious then.

Initialize

The program will include global variables:

| Route2gether(From, To) | This will host all information on routes that are available. Available here means either operative a passenger gave a bid for it a supplier provided a specific offer for it was entered intentionally by Way2gether to stimulate a certain route. Passengers and suppliers won't have a direct access to this variable. Only routes that passed a certain screening criteria will be added to this variable. The zip codes will be pointers that address the subsection of the routes from and to these Zip codes. This to allow faster access to these smaller sections. Below this variable is further elaborated. |
|---|---|
| Carprice(Size_of_car, From, To, RouteID) | This is a function that will return a value: The costs for way2gether to hire a vehicle for Route = Route ID. This value should be returned either based on a price list, i.e. a real cost listed for a specific RouteID or This value can be returned after a calculation that takes certain parameters of the RouteID and uses a formula. Below this variable is further elaborated |
| Suppliers(suppliersID) | Will contain all needed information on each potential supplier and passenger. All Suppliers that gave a serious quotation or came to a real master agreement will get an internal SupplierID. This SupplierID will be the pointer that addresses the details of the Supplier in the Suppliers file Below this variable is further elaborated |

-continued

| | |
|---|---|
| Suppliers(area) | Will return a list of suppliersID's of suppliers that can offer their service in a certain area. |
| Ppassenger(passenger #) | Will contain all needed information on each potential passenger and passenger. All customers that gave a serious bid, (e.g. Credit card details have been screened) will get an internal passenger #. This passenger # will be the pointer that addresses the details of the passenger in the Ppassenger file. Below this variable is further elaborated |
| Define area's | Divide the country in Well known names like Flatbush(Brooklyn) define it on the map. The whole map of the target area should be divided in these areas. It shouldn't be too hard to use an existing map for that. |
| A2Z(Area) | A function that returns an array of zip codes contained in the local area's defined (like Brooklyn, NY). |
| Z2A(Zip) | A function that returns the area (like Brooklyn, NY) that belongs to the Zip entered |
| Distance(From, To) | A function that returns a maximum distance between the From and the to (GSM) coordinates. First this function should look in a table if the distance is not listed for those coordinates. Else it should basically be used for maximum price calculations, and (let say) 30% more than the "straight line value". Way2gether reserves the right to measure it (later) by whatever means including an existing computer program, or writing a more advanced computer program. |
| Constants | Some parameters that in the functions-advanced file can be variables, and supplier or customer depended. In this functions-basic file these have been set constants. |

These variables will be an Excel like "dbase", while the number of rows may expand with time.

In the initialize part al the possible columns will be defined together with an open structure that will allow addition of a lot of rows in each "dbase".

The routes2gether(From,To) will include several routes each with their own RouteID. The RouteID should be a serial number within the defined From and To.

From and To are here the Zip codes (or (GSM)coordinates if this will be more effective) of the start and stop point of a route. The Matrix of one such a RouteId should include the following information Car price/day
<Direct costs for way 2gether>         Current Amount of passengers/day
                                        Defines each weak day

| $50 | Su | Mo | Tu | We | Th | Fr | Sa |
|---|---|---|---|---|---|---|---|
| | 0 | 2 | 3 | 3 | 1 | 2 | W2S |

Suppliers (suppliersID)

This should comain relevant information from each supplier both details and conditions. Including:

| Area | Car types Available (in passengers/car) | Lead-time <time needed to get at "From" after accepting of an order> | Can accept and confirm order by e-mail | | |
|---|---|---|---|---|---|
| Brooklyn, NY | 4-5 pcs | 2 minutes MIN | Yes | | |
| Queens, NY | 7-10 pcs | 30 minutes MAX | | | |
| Manhattan, NY | 10-2 pcs | | | | |
| Satisfaction of customers | Fully booked for periods | e-mail | Address | Contact + phone + fax | |
| 75% | 9/12 10-12.00 10/12 7.00-8.30 11/12 9.30-11.00 11/12 15.00-16.45 | Order@eged.com | Broadway 12 NY. | Moshe Cohen Jean Smith 212-1212-121 | |

Constant values

These may become later route, area, supplier and or customer dependent the values are examples.

The functions-advanced file may se part of them as variables

| Extra pay for home 2 home transport | |
|---|---|
| within 1 km or 5 minutes drive <A cab will collect from residence | $3 |

| Leave | Arrival | Route ID | # of passenger's joined | Passenger #'s That joined already this route With the week days joining And stop-day | Passenger # That bid for the price that will be obtained if more people will joined, each which the amount needed | Street and Number arrive | Street and number leave |
|---|---|---|---|---|---|---|---|
| 8:00 | 9:00 | 15 | 3 | 9968-23456-31122 9965-23406-31082 99612-3400-31072 | 99614-6 99616-8 99621-16 | Broadway 125 | Amsterdam Ave 15 |

| Extra pay for home 2 home transport | |
|---|---|
| and bring you to your work address> Extra pay for each additional kilometer | $2 |

| NominalKmprice(carsize) | |
|---|---|
| Car size | Km price/car |
| 4 passengers | $2.50 |
| 7 passengers | $3 |
| 10 passengers | $3.50 |
| 20 passengers | $4.50 |
| 50 passengers | $6.00 |
| 80 passengers | $7.00 |

| Specific prices that supersedes general pricing (partial list) | | | | |
|---|---|---|---|---|
| From | To | 4p | 7p | 10p |
| Passaic NJ | Manhattan NY | $25 | $29 | $32 |
| JFK NY | Manhattan NY | $25 | $29 | $32 |
| 81298 | 81278 | $20 | $24 | $26 |

| Relative Area rating | | | |
|---|---|---|---|
| 80% of nominal price | 100% of nominal price | 120% of nominal price | 140% of nominal price |
| Class A Oklahoma VA Utah | Class B MA CT CA NY | Class C City centers of Baltimore Miami Texas Etc | Class D Crowded area's Manhattan Chicago center Boston Center |

| Relative hour rating | | | |
|---|---|---|---|
| 80% of nominal price | 100% of nominal price | 120% of nominal price | 140% of nominal price |
| Class A 10:00-15:00 | Class B 6:00-7:00 9:00-10:00 15:00-16:30 18:00-24:00 | Class C 7:00-9:00 16:30-18:00 24:00-1:00 | Class D 1:00-6:00 Sunday (Sabbath with partner Way2Saturday) |

| Mark up (Confidential) <Between suppliers price and accumulated passengers price> | |
|---|---|
| Amount of travelers/vehicle | in % of the costs (example) |
| 1 | 2 |
| 2 | 7 |
| 3 | 10 |
| 4 | 12 |

| Mark up (Confidential) <Between suppliers price and accumulated passengers price> | |
|---|---|
| Amount of travelers/vehicle | in % of the costs (example) |
| 5 or more | 4 + 2* (amount of travelers) |

| Standard terms to Supplier | | |
|---|---|---|
| Suppliers should confirm an order within 5 minutes | Way2gether reserves the right to cancel orders to suppliers. Notice in advance of 60 minutes or more | Payment terms From way2gether to Supplier Net30 |

The Carprice

Carprice(Size_of_car, From, To, RouteID) should return the costs of a car of a certain size for the route defined.

This function should first look if it the route price is explicitly defined as a constant.

If not the price should be calculated as follows:

Carprice=Distance(From, To)*Areafactor*Timefactor*NominalKmprice(carsize).

| General information | |
|---|---|
| Surname | Cohen |
| First name | Moshe |
| Full address | Amsterdam Ave 166 Passaic NJ |
| Credit card number | 123456789123 |
| Credit card details have been verified | Yes |
| Phone | 212-316-7896 |
| Fax | 212-316-7897 |
| Mobile | 211123232121 |
| Email | Cohen@Customer.com |
| Passenger# | 15356564 |
| Credit status | $168 |

| Outstanding bids | | | |
|---|---|---|---|
| From Zip | 99553 | 99552 | 99556 |
| To Zip | 99552 | 99553 | 99553 |
| Route ID | 15 | 16 | 721 |
| Bid valid if the following number of passenger will join | 4 | 4 | 6 |
| Weekdays | 2/3/4/5/6 | 2/3/4/5/6 | 3 |
| Interested till | Dec. 30, 2000 | Dec. 30, 2000 | Aug. 31, 2000 |
| Renewal per | Month | Month | No |
| Latest acknowledge accepted in hours before journey | 48 | 48 | 5 |
| Active | Yes | Yes | No |

Start of main function
Supplier enter details
Introduction:
This optional part may be dealt with manually in the early stage of the way2gether program.
Later a transport company could enter automatically or semi-automatically his details. Some of the conditions may be set by way2gether others by the supplier.
Typical details to include:
What kind of cars are offered.
How many cars can be offered at most.
In what territory can the supplier provide the service
How much time is needed to confirm an order.
At the end of this procedure the supplier should have a master contract with way2gether:
Algorithm:
Please enter your details:

| Company | Area | Car types Available (in passengers/car) | Lead-time <time needed to get at "From" after accepting of an order> | Can accept and confirm order by e-mail |
|---|---|---|---|---|
| Egedt | Brooklyn, NY NY | 4-5 pcs | 2 minutes MIN | Yes |
| | Queens, NY | 7-10 pcs | 30 minutes | |
| | Manhattan, NY | 10-2 pcs | MAX | |

| Fully booked for periods | e-mail for orders | Address | Contacts | Tel/fax/email |
|---|---|---|---|---|
| 9/12 10-12.00 | Order@egedt.com | Broadway 12 NY. | Moshe Catz | 212-2163-385/387 moshe@egedt.com |
| 10/12 7.00-8.30 | | | | |
| 11/12 9.30-11.00 | | | Jan Hein | 212-2163-386/387 Jan@egedt.com |
| 11/12 15.00-16.45 | | | | |

| Bank | Chase Manhattan |
|---|---|
| Account number | 145668787374 |

Way2gether enters details
This part allows way2gether to change the conditions from time to time.
The most important part will be to fix the constants of the pricing functions and the marking-up function. Additionally it may include the Sponsoring of some routes.
Customer enters details
This function should collect information from the customer.
This should include a description of the route and schedule he is interested in.
It will also include an indication how severe each requirement is.
Check if the details make sense
This function should debug the information entered by the customer.
If it doesn't make sense or is incomplete the customer should have an opportunity to correct and/or complete the details he entered.
Screen for available routes
Look for routes in "Routes2gether" that meet the customer requirements. Add these to his personal "Routes2offer" Matrix, within the defined tolerances.
If no route in "Routes2gether" meets the requirements then:
Add at least one route close to the requirements to the "Routes 2offer" Matrix
Create a temporary "custom" route exactly like the customer requested and add this to the "Routes2offer" Matrix.
Calculate 100% pricing
Calculate the pricing to offer this customer for all routes from his personal "Routes2offer" matrix.
Calculate <100% pricing
Assume another passenger will join the same route.
Calculate pricing with this additional passenger
Calculate the chance2deal: The chance that indeed another passenger will join, using the proprietary "Chance2deal" function.
If the chance2deal remains high enough, this procedure can be repeated.
Add this offer with the pricing and chance2deal to the routes2offer matrix.
The customer selects from the Routes2offer
Show all the routes2offer with their details to the customer. These should include price and chance2deal.
The customer should be able to select one of the offered routes at one of the prices offered.
Collect personal information
This should include credit card or other paying information.
Update
Give the info of the new customer to the chauffeur for existing routes.
Update he Routes2gether file and other relevant files
Order
If the route didn't exist yet, look what will be the Preferred_supplier (Area).
Order the route at the preferred supplier.
Follow up on order
Remind and/or cancel and order at another supplier, if the supplier does not acknowledge the order.
Once an acknowledgment of the order is received, update the Routes2gether file and other relevant files
Confirm the order
If the customer chose a 100% offer this can be done immediately.
If not, the customer should get immediately info when he might get a confirmation.
His bid should be saved and update the routes2gether file accordingly. Once enough passengers join the bid, the customer will be confirmed automatically.
Bill the customer
Preferably by using his credit-card info. Other options may be possible as well.
Options
Are not included in this main program, but can be added later.

Independent functions

Create independent functions that can be put in a library, i.e. not be a real part of the main function, e.g.:

A distance function that calculates and/or finds the distance between 2 Zip codes/addresses or coordinated (GSM):Distance (X,Y)

They may be called from other functions.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombinaton.

It will be appreciated by persons skilled in the art that the present invention is not limited to what had been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

| Egedt | Brooklyn, NY | 4-5 pcs | 2 minutes MIN | Yes |
| | Queens, NY | 7-10 pcs | 30 minutes | |
| | Manhattan, NY | 10-2 pcs | MAX | |

| Fully booked for periods | e-mail for orders | Address | Contacts | Tel/fax/email |
| --- | --- | --- | --- | --- |
| 9/12 10-12.00 10/12 7.00-8.30 | Order@egedt.com | Broadway 12 NY. | Moshe Catz | 212-2163-385/387 moshe@egedt.com |
| 11/12 9.30-11.00 11/12 15.00-16.45 | | | Jan Hein | 212-2163-386/387 Jan@egedt.com |

| Bank | Chase Manhattan |
| --- | --- |
| Account number | 145668787374 |

Way2gether enters details

This part allows way2gether to change the conditions from time to time.

The most important part will be to fix the constants of the pricing functions and the marking-up function. Additionally it may include the Sponsoring of some routes.

Customer enters details

This function should collect information from the customer.

This should include a description of the route and schedule he is interested in.

It will also include an indication how severe each requirement is.

Check if the details make sense

This function should debug the information entered by the customer.

If it doesn't make sense or is incomplete the customer should have an opportunity to correct and/or complete the details he entered.

Screen for available routes

Look for routes in "Routes2gether" that meet the customer requirements. Add these to his personal "Routes2offer" Matrix, within the defined tolerances.

If no routes in "Routes2gether" meets the requirements then:

Add at least one route close to the requirements to the "Routes2offer" Matrix

Create a temporary "custom" route exactly like the customer requested and add this to the "Routes2offer" Matrix.

Calculate 100% pricing

Calculate the pricing to offer this customer for all routes from his personal "Routes2offer" matrix.

Calculate<100% pricing

Assume another passenger will join the same route.

Calculate pricing with this additional passenger

Calculate the chance2deal: The chance that indeed another passenger will join, using the proprietary "Chance2deal" function.

If the chance2deal remains high enough, this procedure can be repeated.

Add this offer with the pricing and chance2deal to the routes2offer matrix.

The customer selects from the Routes2offer

Show all the routes2offer with their details to the customer. These should include price and chance2deal.

The customer should be able to select one of the offered routes at one of the prices offered.

Collect personal information

This should include credit card or other paying information.

Update

Give the info of the new customer to the chauffeur for existing routes.

Update the Routes2gether file and other relevant files

Order

If the route didn't exist yet, look what will be the Preferred_supplier (Area).

Order the route at the preferred supplier

Follow up on order

Remind and/or cancel and order at another supplier, if the supplier does not acknowledge the order.

Once an acknowledgement of the order is received, update the Routes2gether file and other relevant files.

Confirm the order

If the customer chose a 100% offer this can be done immediately.

If not, the customer should get immediately info when he might get a confirmation.

His bid should be saved and update the routes2gether file accordingly. Once enough passengers join the bid, the customer will be confirmed automatically.

Bill the customer

Preferably by using his credit-card info. Other options may be possible as well.

Options

Are not included in this main program, but can be added later.

Independent functions

Create independent functions that can be put in a library, i.e. not be a real part of the main function, e.g.:

A distance function that calculates and/or finds the distance between 2 Zip codes/addresses or coordinates (GSM): Distance(X,Y)

They may be called from other functions.

It is appreciated that certain feature of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

The invention claims is:

1. A method of processing bids over a network for an item to be sold, using a time based factor and an automated bidding utility, the method comprising,
    setting a first threshold bid price level at which to offer the item at a first time,
    setting a second threshold bid price level at which to offer the item at a second time subsequent to said first time,
    defining a bid time function that assigns bid price levels to intermediate times between said first time and said second time, the bid time function being a continuous function,
    defining an automated bidding utility, said automated bidding utility enabling bidders to input one of said bid price levels or said intermediate times,
    wherein said automated bidding utility calculates the other of said bid price levels or intermediate times according to said bid time function and outputs said other of said bid price level or intermediate time to a respective bidder,
    receiving one or more_bids over said network from said automated bidding utility,
    upon receipt of a bid comprising a bid price, calculating or obtaining from said automated bidding utility a bid time for said bid as a time to which said bid price has been assigned by said bid time function, and
    accepting bids received in an order of respective calculated or obtained bid times.

2. A method according to claim 1, wherein said first threshold bid price level is higher than said second threshold bid price level and a first bid to be accepted from a plurality of bids to be received is a bid having an earliest calculated bid time.

3. A method according to claim 1 wherein said first threshold bid price level is higher than said second threshold bid price level and comprising the step of accepting any bid from a plurality of received bids, which has an earliest calculated bid time in the past and then accepting received bids as a respective calculated bid time is reached.

4. A method according to claim 1, wherein said calculated bid time is a linear function of the passage of time between said first time and said second time.

5. A method according to claim 1, wherein said bid time function is a linear function of the interval between said first threshold bid level and said second threshold bid level.

6. A method according to claim 1, wherein said bid time function is a linear function of the passage of time between said first time and said second time, and of the interval between said first threshold bid level and said second threshold bid level, such that any bid within said threshold bid levels is mappable onto a calculated bid time.

7. A method according to claim 1, wherein said second bid price level is allowed to vary during bidding as a function of a total quantity of accepted bids.

8. A method according to claim 7, comprising the step of defining a plurality of quantity price threshold levels, and using said levels to contribute to a determination of said final bid price.

9. A method according to claim 1, comprising the further step of using data of existing bids to calculate a probability of acceptance of a new bid at a given price level.

10. A method according to claim 1, wherein a bidder is given a personal discount dependent on a quantity bid for by said bidder.

11. A method according to claim 1, wherein a plurality of quantity/price levels are set, wherein for each quantity price level it is ascertained whether a total quantity ordered of all bids down to and including said price level equals the corresponding quantity level, and if so a bid acceptance price is set at the lowest of said price/quantity levels.

12. A method according to claim 11, wherein a bidder is additionally given a personal discount dependent on a quantity bid for by said bidder.

* * * * *